(12) United States Patent
Bartelet

(10) Patent No.: US 9,334,115 B2
(45) Date of Patent: May 10, 2016

(54) DEVICE AND METHOD FOR THE HANDLING OF LUGGAGE

(71) Applicant: Vanderlande Industries B.V., Veghel (NL)

(72) Inventor: Gijsbrecht Jean Marie Bartelet, S-Hertogenbosch (NL)

(73) Assignee: Vanderlande Industries B.V., Veghel (NL)

( * ) Notice: Subject to any disclaimer, the term of this patent is extended or adjusted under 35 U.S.C. 154(b) by 107 days.

(21) Appl. No.: 14/191,905

(22) Filed: Feb. 27, 2014

(65) Prior Publication Data
US 2014/0241837 A1 Aug. 28, 2014

(30) Foreign Application Priority Data
Feb. 27, 2013 (NL) ..................................... 2010366

(51) Int. Cl.
*B65G 1/10* (2006.01)
*B64F 1/36* (2006.01)

(52) U.S. Cl.
CPC . *B65G 1/10* (2013.01); *B64F 1/366* (2013.01); *B64F 1/368* (2013.01)

(58) Field of Classification Search
CPC ............ B65G 1/10; B65G 1/12; B64F 1/368; B64F 1/366
USPC ............ 414/273, 277, 278, 279, 281, 331.01, 414/331.04, 331.08
See application file for complete search history.

(56) References Cited

U.S. PATENT DOCUMENTS

| | | | | |
|---|---|---|---|---|
| 3,561,623 A | * | 2/1971 | McCaul | 198/350 |
| 3,695,462 A | * | 10/1972 | Sullivan | 414/273 |
| 5,124,554 A | * | 6/1992 | Fowler et al. | 250/358.1 |
| 5,842,555 A | * | 12/1998 | Gannon et al. | 198/358 |
| 5,934,444 A | * | 8/1999 | Kierpaul et al. | 198/580 |
| 6,164,892 A | * | 12/2000 | Malloy et al. | 414/398 |
| 8,596,947 B1 | * | 12/2013 | Stenzel | 414/331.04 |
| 2010/0145502 A1 | * | 6/2010 | Kratzmaier | 700/218 |
| 2011/0002761 A1 | * | 1/2011 | Aimable-Lima et al. | 414/340 |

FOREIGN PATENT DOCUMENTS

| | | | |
|---|---|---|---|
| DE | 102012013247 A1 | * | 1/2014 |
| FR | 2975078 A1 | * | 11/2012 |
| WO | WO 2012/130876 | | 10/2012 |
| WO | WO 2012130876 A1 | * | 10/2012 |
| WO | WO 2013076349 A1 | * | 6/2013 |
| WO | WO 2015050440 A1 | * | 4/2015 |

OTHER PUBLICATIONS

Search Report & Written Opinion of NL 2010366 dated Nov. 20, 2013.

* cited by examiner

*Primary Examiner* — Kaitlin Joerger
(74) *Attorney, Agent, or Firm* — Mark J. Nahnsen; Barnes & Thornburg LLP

(57) ABSTRACT

The present invention relates to a device for handling items of luggage, comprising a storage system for temporary storage therein of items of luggage, which system comprises at a front side thereof a plurality of compartments for items of luggage with a buffer zone behind each compartment, and for each of the compartments a displacement element for moving an item of luggage from a compartment to the buffer zone associated with that compartment, input means designed for the input of identification information by a passenger for the purpose of placing an item of luggage in a compartment of the storage system, and control means. The invention further relates to a method of handling items of luggage.

16 Claims, 6 Drawing Sheets

DEVICE AND METHOD FOR THE HANDLING OF LUGGAGE

Figure 1:
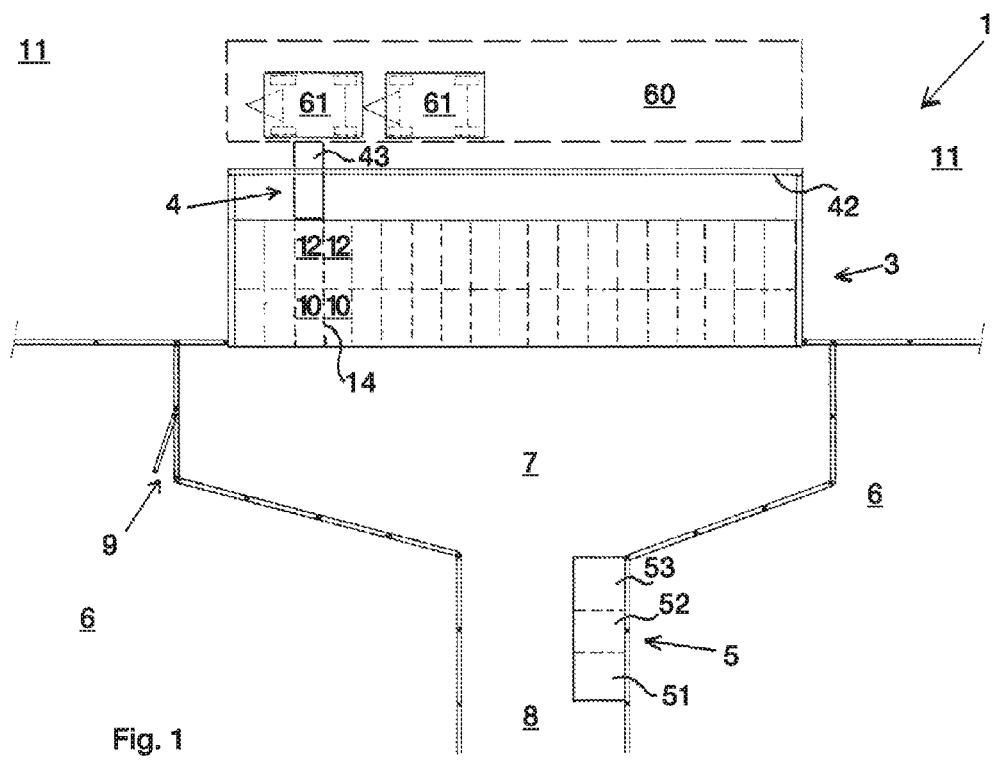

The present invention relates to a device and a method for handling items of luggage.

The invention, at least in an embodiment of the device designed for the handling of outbound luggage, or, for the checking-in of luggage, is particularly envisaged for use in an airport provided with so-termed "clean terminals", which means that passenger and luggage, both hand luggage and luggage to be checked in, or, hold luggage, are screened immediately upon entering the terminal building. This renders it unnecessary to screen items of luggage, especially hold luggage, in the luggage handling system.

It is an object of the present invention to provide a compact device for handling items of luggage wherein the number of manipulation actions performed on items of luggage by the device is small.

Said object is achieved by means of the device for handling items of luggage according to the invention, which comprises:
- a storage system for temporary storage therein of items of luggage, comprising at a front side thereof a plurality of compartments for items of luggage located next to and above one another and mutually separated by wall elements, wherein behind each of said plurality of compartments a buffer zone associated with the respective compartment is provided for at least one item of luggage, and wherein for each of said plurality of compartments a respective displacement element is provided designed for displacing an item of luggage from a compartment to the buffer zone associated therewith and/or from a buffer zone to the associated compartment,
- input means designed for the input of identification information by a passenger for the purpose of placing an item of luggage of said passenger in a compartment of the storage system or taking such an item of luggage from a compartment of the storage system,
- control means designed for indicating to a passenger, in dependence on the identification information put in by said passenger with said input means, a compartment of the storage system in which to place an item of luggage or from which to take an item of luggage, and for controlling the relevant displacement elements so as to displace an item of luggage from a compartment to the associated buffer zone and/or vice versa.

It is an advantage of the device according to the invention that an extremely compact device for handling outbound, i.e. check-in, and/or inbound, i.e. reclaim, items of luggage is provided, comprising a limited number of components and requiring a very limited number of manipulation actions on items of luggage.

In the case of the handling of outbound items of luggage, the displacement element is designed for displacing an item of luggage from a compartment to a buffer zone associated with that compartment, and the control means are designed for controlling the respective displacement elements so as to move an item of luggage from a compartment to the associated buffer zone. In the case of handling of inbound items of luggage, the displacement element is designed for displacing an item of luggage from a buffer zone to the associated compartment, and the control means are designed for controlling the respective displacement elements so as to move an item of luggage from a buffer zone to the associated compartment. The device according to the invention is preferably designed for handling both inbound and outbound items of luggage, whereby a particularly universally applicable device is achieved.

The identification information is preferably such, at least when relating to outbound luggage, that at least the passenger's flight and the number of items of luggage of said passenger to be checked in for that flight are known from this information. It is highly preferable that a reclaim ticket is used for the input of the identification information in the case of inbound luggage.

Highly preferably, the system further comprises a transfer device that is provided adjacent to the storage system and that is reciprocally displaceable along the storage system such that an item of luggage can move from any of the buffer zones to said transfer device for transfer of said item of luggage to a luggage discharge means arranged in a collection location, such as a luggage holder such as a luggage trolley, or a luggage conveyor belt, and/or such that an item of luggage, such as preferably coming from a transport means for inbound luggage, can move into any buffer zone. In an alternative embodiment of the device according to the invention, items of luggage are manually taken from the buffer zones for transfer to a luggage discharge means, or items of luggage are manually placed in the buffer zones, so that subsequently they can be moved into the respective associated compartments by the displacement means.

In an embodiment, the transfer device can be manually operated for moving an item of luggage into and/or out of buffer zones. The transfer device in a preferred embodiment comprises for this purpose a luggage transfer unit such as the loading aid marketed by Vanderlande Industries B.V. under the trade name STACK@EASE.

In an advantageous preferred embodiment, the control means are also designed for controlling the transfer device so as to cause an item of luggage to move from a buffer zone to the transfer device and/or vice versa. Items of luggage can thus be placed in buffer zones and/or taken from buffer zones in an automated manner by means of the transfer device.

The invention in a preferred embodiment thereof relates to a device for handling items of luggage, at least for handling outbound items of luggage, comprising:
- a storage system for temporary storage therein of items of luggage, comprising at a front side thereof a plurality of compartments for items of luggage located next to and above one another and mutually separated by wall elements, wherein behind each of said plurality of compartments a buffer zone associated with the respective compartment is provided for at least one item of luggage, and for each of said plurality of compartments a respective displacement element is provided designed for displacing an item of luggage from a compartment to the buffer zone associated therewith,
- a transfer device that is provided adjacent to the storage system and that is reciprocally displaceable along the storage system such that an item of luggage can move from any of the buffer zones to said transfer device for transfer of said item of luggage to a luggage holder, such as a luggage trolley, arranged in a collection location,
- input means designed for the input of identification information by a passenger for the purpose of placing an item of luggage of said passenger in a compartment of the storage system,
- control means designed for indicating to a passenger, in dependence on the identification information put in by said passenger with said input means, a compartment of the storage system in which to place an item of luggage, for controlling the relevant displacement elements so as to displace an item of luggage from a compartment to the associated buffer zone, and for controlling the transfer device such that it causes an item of luggage to move from a buffer zone into the transfer device.

In an embodiment, the control means are also designed for moving an item of luggage from a buffer zone into a different buffer zone by means of the transfer device. This may be advantageously implemented especially in a device for handling inbound items of luggage because a high degree of occupancy of compartments can be achieved thereby. It is also possible by these means to transfer an item of luggage belonging to a first passenger and present in a first buffer zone, while a second item of luggage belonging to a second passenger is present in the compartment associated with this first buffer zone, to a different combination of buffer zone and compartment if the first passenger addresses the device before the second passenger does so.

It is advantageous if each compartment at a front side thereof comprises a first closing element that is switchable between a compartment closed state, in which no item of luggage can be placed into or taken from the compartment, and a compartment release state, in which an item of luggage can be placed into or taken from the compartment, while the control means are designed for switching the respective first closing elements between the compartment closed state and the compartment release state. An effective closure of compartments is realized thereby. The safety of use of the device for passengers is enhanced thereby because such a closing element renders it possible to close the compartment before any other actions are performed on the item of luggage, such as the displacement thereof from a compartment to the buffer zone. If the device is used for inbound or reclaim luggage, an item of luggage can be put ready in a screened off manner as a result of this until a passenger appears at the device for collecting his/her item of luggage.

It is furthermore advantageous if each compartment at a rear side thereof, i.e. between the compartment and the buffer zone, comprises a second closing element that is switchable between a buffer closed state, in which no item of luggage can be displaced between the compartment and the associated buffer zone, and a buffer release state, in which an item of luggage can be displaced between the compartment and the associated buffer zone, while the control means are designed for switching the respective second closing elements between the buffer closed state and the buffer release state. An effective separation is achieved thereby between the compartments, which should be accessible to passengers or at least to individuals during the placement of an item of luggage into a compartment or the removal of such a piece from a compartment, and the buffer zones, i.e. the portion of the device that is located behind the compartments and that should not be accessible to passengers.

Preferably, the control means are designed for moving the first and second closing elements such that, when the first closing element of a compartment is in the compartment release state, the second closing element of that compartment will be in the buffer closed state. It can be safeguarded to an even higher degree thereby that the portion of the device located behind the compartments is inaccessible to passengers.

In a simple preferred embodiment, the displacement element comprises a conveying element that extends in the buffer zone and that is designed for carrying at least one, and preferably at least two items of luggage. It is furthermore advantageous if the displacement element also comprises a further conveying element that extends in the compartment and that meets with the conveying element in the associated buffer zone such that an item of luggage can be transferred from the further conveying element directly onto the conveying element of the buffer zone.

The conveying element is preferably formed by a conveyor belt. The further conveying element is preferably also formed by a conveyor belt. The conveyor belt is preferably capable of being driven in two directions.

Alternatively, the displacement element comprises a single conveying element that extends in a compartment as well as in an associated buffer zone and that is preferably formed by a conveyor belt. Said conveyor belt is preferably capable of being driven in two directions.

In yet another alternative embodiment, the displacement element is designed for moving an item of luggage from a compartment to the associated buffer zone under the influence of the forces of gravity. The displacement element for this purpose preferably comprises a chute element. The control means in this case are designed for switching the displacement element between a neutral position, in which an item of luggage remains in the compartment, and a displacement position, in which the item of luggage moves from the compartment to the associated buffer zone under the influence of the forces of gravity. A blocking element may be provided for this purpose, which in an embodiment is formed by the second closing element. In an embodiment, the chute element can be tilted by pivoting means between the neutral position and the displacement position, in which an item of luggage can slide down from a compartment into the associated buffer zone.

It is advantageous if the transfer device comprises a luggage crane which is displaceable along the storage system and which comprises a vertically adjustable transferrer element that extends away from the storage system in the direction of the collection location such that said transferrer element can be positioned adjacent to each of the buffer zones.

Preferably, the transferrer element has a support surface for items of luggage that can be positioned, under the influence of the control of the luggage crane by the control means, in at least substantially the same plane as a support surface for items of luggage of the conveying element of the displacement element of a buffer zone, while said control means are also designed for controlling the transferrer element and the conveying element such that an item of luggage present on the conveying element can move onto the transferrer element and/or vice versa. It is highly advantageous herein when the transferrer element is also formed by a conveyor belt. In an embodiment, the transferrer element can be lengthened, for example in a sliding manner, preferably telescopically, in the direction of the collection location. It is advantageous then if the transferrer element further comprises a pusher element at least for transferring the item of luggage to the luggage discharge means, which pusher element is capable of pushing an item of luggage off the transferrer element, preferably during a return movement thereof, such that it will arrive in at least substantially the correct location on the luggage discharge means at the area of the collection location.

In an embodiment, the storage system has compartments of a first type with first dimensions and compartments of a second type with second dimensions different from the first dimensions. A utilization of the capacity can be further optimized thereby in that a compartment of the first or of the second type is allotted to an item of luggage in dependence on the dimensions of said item of luggage. Optionally, the storage system may comprise compartments of a third or yet further type, again with different dimensions. It is advantageous if the depth of each of the plurality of compartments is the same or substantially the same.

It is advantageous if the depth of a buffer zone, viewed from a front side thereof adjoining the associated compartment up to a rear side remote from the compartment, corresponds substantially to the width of a luggage discharge means. In that case all items of luggage present in a buffer zone, i.e. a "row" of items of luggage, can be transferred in one operation directly onto a luggage discharge means in the same "row", which is highly efficient and not subject to malfunctions. The "width" of a luggage discharge means such as a luggage trolley within the context of the present invention is deemed to denote the dimension thereof parallel to the depth dimension of the buffer zone. The depth of the buffer zone preferably lies in a range of 1 to 2 m, more preferably a range of 1.30 to 1.70 m.

It is also advantageous in this respect if the distance from an end of at least the support surface of the transferrer element located at the side of the storage system to an end thereof located at the side of the collection location corresponds substantially to the depth of a buffer zone as viewed from a front side thereof adjoining the associated compartment to a rear side thereof remote from said compartment. The length of said support surface thus also lies preferably in a range of 1 to 2 m, more preferably a range of 1.30 to 1.70 m.

It is advantageous if the device comprises a conveyer means for luggage holders at the area of the collection location. This conveyer means may be configured, for example, as a conveyor belt, a roller track or a ball deck.

It is advantageous if the input means comprise a scanner device for scanning a boarding pass, an identity document such as a passport, or a reclaim ticket of a passenger. The scanner device may be separately accommodated in a kiosk away from the storage system, or alternatively in the front wall of the storage system where also the compartments that can be accessed by the passengers are arranged.

In an advantageous embodiment, external dimensions of the storage system correspond at least substantially to the dimensions of a container of the "40 ft shipping container" type. The storage system can then be transported in a comparatively simple manner, for example by road.

It is furthermore advantageous if the first closing elements of the plurality of compartments are located substantially in one and the same vertical plane, which vertical plane, defining a front surface of the storage system that is accessible to passengers in the operational state, corresponds to a lateral side of said container.

It is advantageous in this connection if the storage system is at least substantially box-shaped having a width, height and depth, the depth being viewed from a front to a rear of the storage system in its operational state, wherein the width is greater than the depth by a factor of 2 up to 10, preferably by a factor of approximately 5, and wherein the height is approximately equal to the depth, while the buffer zones associated with the compartments provided at the front next to one another, i.e. in the width direction, and above one another, i.e. in the vertical direction, extend mutually in parallel behind the compartments from said compartments to the rear of the storage system.

The present invention also relates to a method of handling items of luggage, more specifically outbound items of luggage, with the use of a device for handling luggage according to the invention as described above, wherein
the displacement element is designed at least for displacing an item of luggage from a compartment to the buffer zone associated with that compartment,
the control means are designed at least for controlling the respective displacement elements for the displacement of an item of luggage from a compartment to the associated buffer zone, said method comprising the steps of:
a) input by a passenger via the input means of an identification information, said identification information being preferably such that at least the passenger's flight and the number of items of luggage of this passenger to be checked in are known from this information,
b) indicating a compartment of the storage system to the passenger with the use of the control means,
c) placing an item of luggage in said compartment,
d) controlling, by the control means, of the displacement element belonging to said compartment such that the item of luggage is displaced from the compartment into the buffer zone,
e) achieving that the item of luggage is transferred from the buffer zone to a luggage discharge means arranged in a collection location, such as a luggage holder or a luggage trolley, or to a luggage conveyor belt.

The advantages of the method according to the invention are analogous to the advantages of the device according to the invention mentioned above.

It is advantageous in this case if the device further comprises a transfer device that is, or at least that can be provided adjacent to the storage system and that is reciprocally displaceable along the storage system such that an item of luggage can be moved from any of the buffer zones to the transfer device for the purpose of transferring this item of luggage from the buffer zone to the luggage discharge means present in the collection location,
wherein the control means are preferably also designed for controlling the transfer device so as to cause an item of luggage to move from a buffer zone to the transfer device, which method comprises as part of step e):
e1) by means of the transfer device, causing an item of luggage to move from a buffer zone to the transfer device, preferably in that the control means control at least the transfer device such that an item of luggage present in a buffer zone moves onto the transfer device, and
e2) transferring an item of luggage present on the transfer device from this transfer device to a luggage discharge means, preferably in that the control means control the transfer device such that an item of luggage present on the transfer device can be transferred, at the area of a luggage discharge means such as a luggage holder, to this luggage discharge means.

A highly efficient method of handling outbound luggage is provided in this manner.

In an advantageous embodiment of the method, the latter comprises after step c) and prior to step e) a step of displacing the storage system from a location at a distance from the transfer device towards the transfer device so as to provide the transfer device adjacent to the storage system. This method is particularly suitable for the temporary storage of luggage in the storage system in a first location such as a parking space outside the departures hall, whereupon the storage system, which in this case preferably has external dimensions at least substantially corresponding to those of a container of the "40 ft shipping container" type, is displaced, for example on a trailer, or in the form of a trailer if the storage system is provided with wheels, to the transfer device. The transfer device may be arranged in a region closed to passengers, where the storage system can be unloaded, for example with the use of the transfer device.

Preferably, each compartment comprises at a front side thereof a first closing element that is switchable between a compartment closed state, in which no item of luggage can be placed in the compartment, and a compartment release state, in which an item of luggage can be placed in the compartment, and each compartment comprises equally preferably at the rear side, between the compartment and the associated buffer zone, a second closing element that is switchable between a buffer closed state, in which no item of luggage can be displaced from the compartment into the associated buffer zone, and a buffer release state, in which an item of luggage can be displaced from the compartment into the associated buffer zone. In this situation, the method preferably comprises, for the purpose of step b) switching, by the control means, of the first closing element of a compartment to its compartment closed state, and equally preferably for the purpose of step d) switching, by the control means, of the second closing element of the compartment to its buffer release state and of the first switching element of the compartment to its compartment closed state.

Given the presence of a conveying element in the buffer zone and of a further conveying element in the compartment, as mentioned above, it is advantageous if the method comprises as part of step d), if a different item of luggage is present already in the buffer zone, a controlling action by the control means on the conveying element and the further conveying element such that an item of luggage present in a compartment is transferred to the conveying element so as to adjoin said different item of luggage. The available capacity of the buffer zone is optimally utilized thereby and it is made possible to store a more than average number of items of luggage in the relevant buffer zone in the case of comparatively short items of luggage being present in the buffer zone, for example three pieces of approximately 50 cm instead of two pieces of 75 cm, viewed in the depth direction of the buffer zone.

It is furthermore advantageous if the input means comprise a scanner device for scanning a boarding pass or identity document of a passenger, the method preferably comprising as part of step a) that the passenger causes said boarding pass or identity document to be read by the scanner device for the input of the identification information.

The device preferably also comprises label issuing means, such as a label printer, for providing a label on the basis of the identification information put in by the passenger, the method then preferably comprising a further step of providing said label on the item of luggage before this item of luggage is placed in a compartment.

It is furthermore advantageous if the device also comprises an analysis device that is operationally connected to the control means for determining the weight and/or dimensions of an item of luggage, in which case the method as part of step b) preferably comprises a determination by the analysis device of the weight and/or dimensions of the item of luggage, and the indication to the passenger of a compartment of the storage system by the control means will take place in dependence on the weight and/or dimensions of the item of luggage as determined by the analysis device.

It is advantageous if the device comprises a further scanner at the area of the storage system for scanning a boarding pass or identity document, such a further scanner being preferably provided at each of the plurality of compartments, and the method then preferably comprises as part of step c) that the passenger scans the boarding pass or identity document using said further scanner, whereupon the compartment is released by the control means. This double identification of the passenger enhances the security of the handling of items of luggage.

It is furthermore advantageous if the storage system comprises for each compartment scanning means operationally connected to the control means for scanning a label of an item of luggage placed in said compartment, in which case the method, after the insertion of item of luggage by the passenger in step c), preferably comprises a step of scanning of the label of the item of luggage such that the control means can verify whether the correct item of luggage was placed in the compartment. It can be safeguarded by this check that the item of luggage envisaged for a compartment has actually been placed in this compartment and that not a different item of luggage, or no luggage at all, has been inserted.

In an efficient embodiment, the method comprises as part of step e1) a transfer of all items of luggage in immediate succession from a buffer zone to the transfer device.

The invention also relates to a method of handling items of luggage, more specifically inbound or reclaim luggage, with the use of a device for handling luggage according to the present invention, wherein the displacement element of the device is designed at least for displacing an item of luggage from a buffer zone to a compartment associated with that buffer zone, the control means of the device are designed at least for controlling the respective displacement elements so as to displace an item of luggage from a buffer zone to the associated compartment, which method comprises the steps of:
a) placing an item of luggage in a buffer zone, such as by means of a transfer device as described above, in that an item of luggage is moved from a luggage transport means at the area of the collection location via the transfer device to a buffer zone,
b) controlling, by the control means, the displacement element of the compartment associated with said buffer zone such that the item of luggage is displaced from the buffer zone into the compartment,
c) input of identification information by a passenger using the input means,
d) indicating to the passenger, by the control means, in which compartment of the storage system this passenger's item of luggage is present,
e) taking said item of luggage from the relevant compartment.

A highly effective storage system for presenting inbound passengers with their luggage is provided thereby, which is particularly safe if the storage system is provided with said first closing element for each compartment. Arrived at the device, a passenger can have his/her reclaim ticket scanned by the input means, whereupon the compartment in which the relevant item of luggage is situated will be displayed. The passenger can then take his/her item of luggage from this compartment.

An arrivals space of an airport can be particularly effectively utilized with the use of such devices according to the invention because the storage system is capable of accommodating items of luggage originating from different flights. This is in contrast to the usual luggage carrousels which are assigned to one specific flight.

In an embodiment, the control means are designed for transmitting information in a wireless manner to a communication device, such as a passenger's telephone, about a specific compartment from among the plurality of compartments, in which specific compartment an item of luggage of this passenger is available. The input means in an embodiment may comprise scanning software for the passenger's communication device, such that the identification information, for example of a reclaim ticket, can be scanned by means of this communication device.

The transfer device is preferably provided with scanner means connected to the control means for scanning a label or the like of an item of luggage so as to identify this item of luggage. In combination therewith or alternatively thereto, the buffer zones or the compartments of the storage system may each comprise such scanner means connected to the control means. The identity of each item of luggage present in a compartment is thus known, i.e. the item of luggage can be coupled to the associated passenger.

Each compartment thus preferably comprises at a front side thereof a first closing element that is switchable between a compartment closed state, in which no item of luggage can be placed into the compartment, and a compartment release state, in which an item of luggage can be placed into the compartment, and equally preferably each compartment comprises at a rear side thereof, i.e. between the compartment and the associated buffer zone, a second closing element that is switchable between a buffer closed state, in which no item of luggage can be displaced from the compartment to the associated buffer zone, and a buffer release state, in which an item of luggage can be displaced from the compartment to the associated buffer zone. In this connection the method preferably comprises that the control means switch the first closing means of the compartment to the compartment release state for the purpose of step d). After the item of luggage has been taken out, the first closing element can be switched to its closed state again, while the method for the purpose of step b) then comprises that the control means switch the second closing element of the compartment to the buffer release state. In an embodiment, only items of luggage of a certain type are placed in buffer zones in step a), whereas other items of luggage, i.e. coming from the same flight, are transported to a conventional luggage carrousel. Items of luggage of a certain type may be, for example, items of luggage of passengers flying in a certain class, for example business class, or items of luggage complying with certain maximum dimensional requirements.

Figure 2:
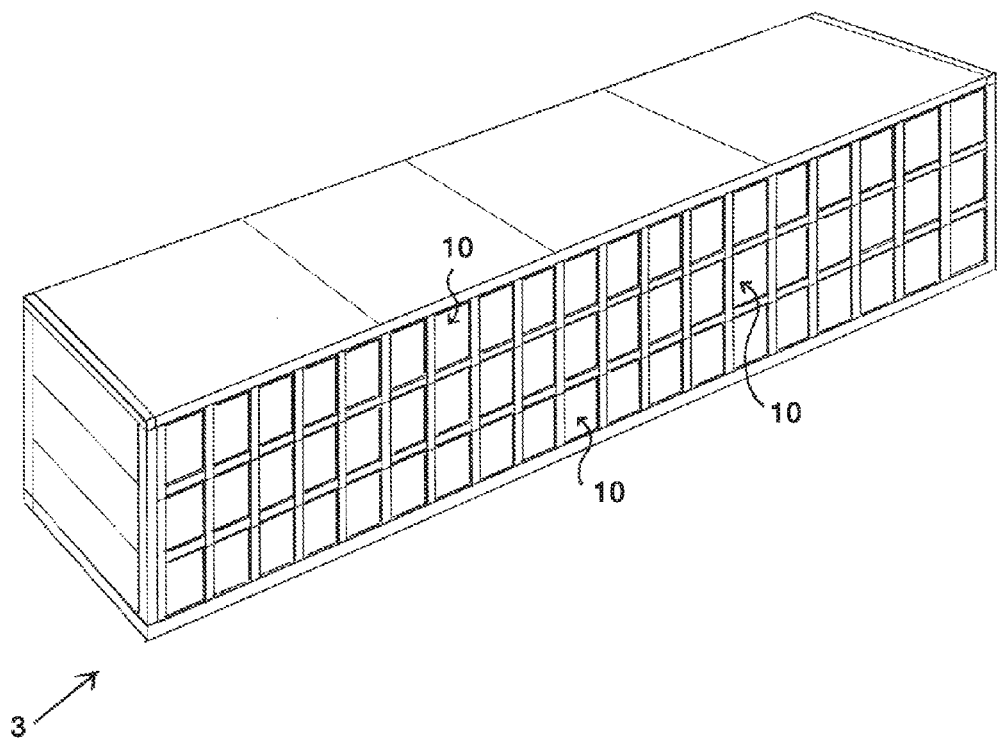
Figure 3:
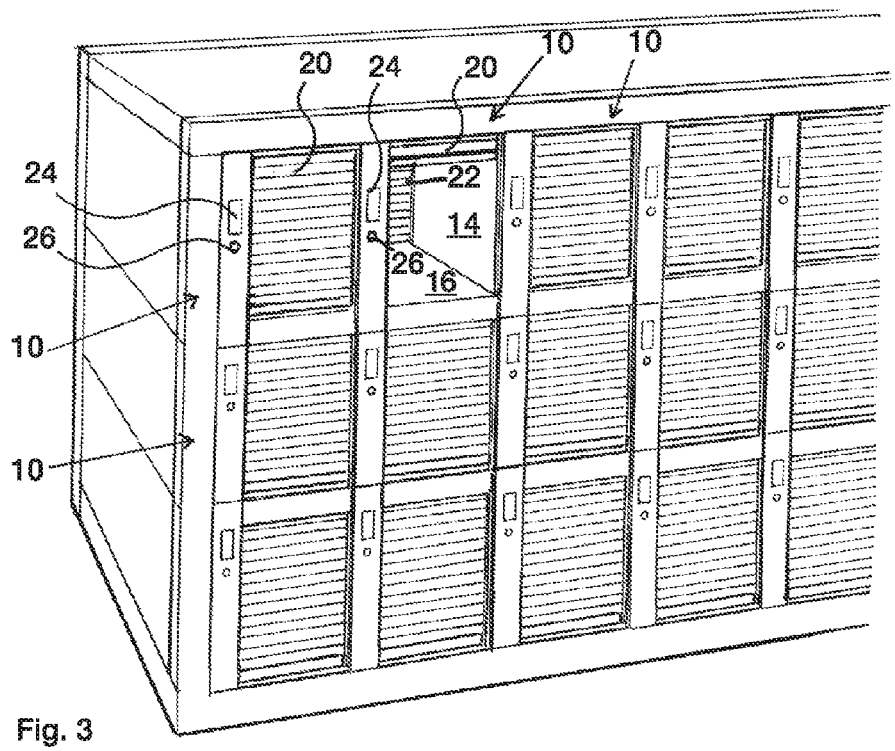
Figure 4:
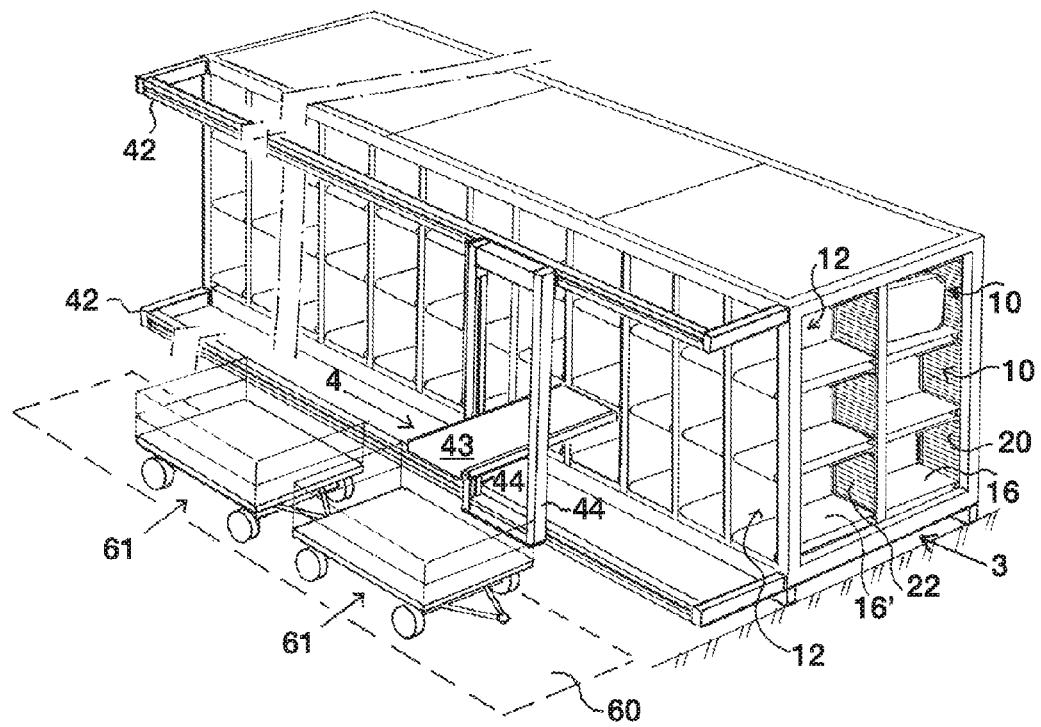
Figure 5A:
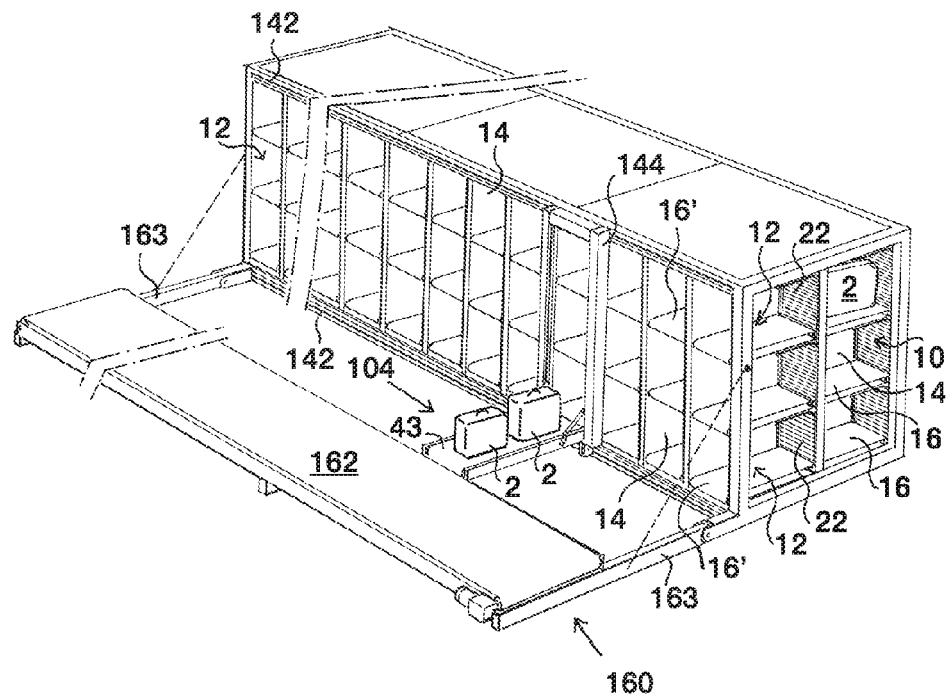
Figure 5B:
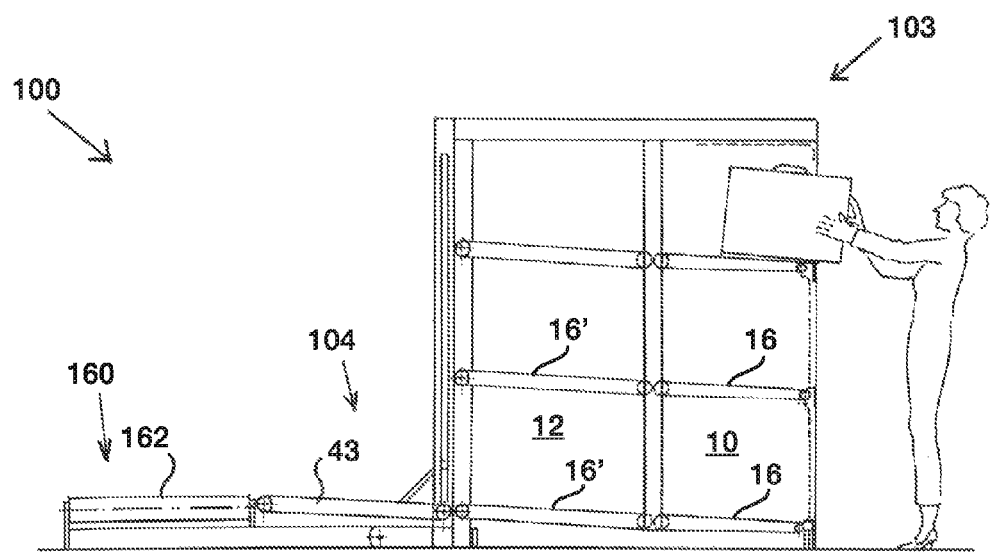
Figure 6:
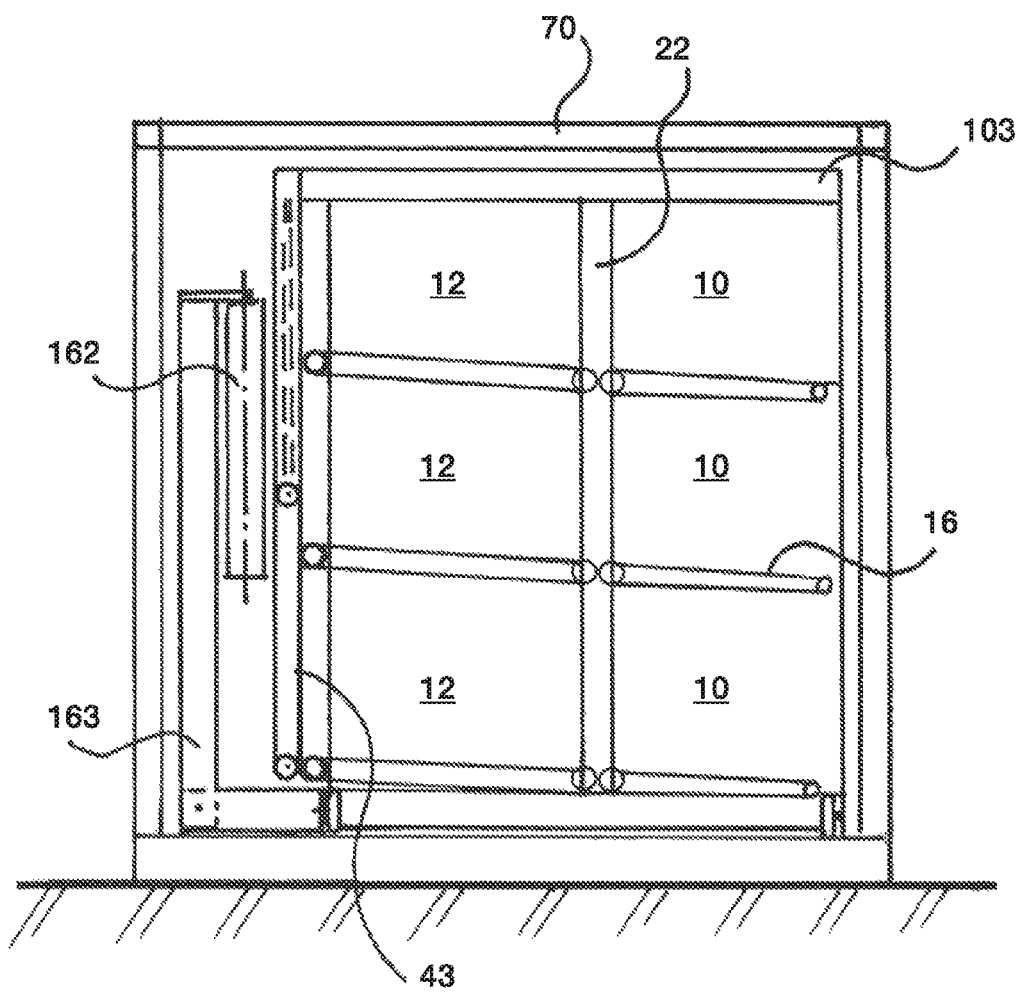
Figure 7A:
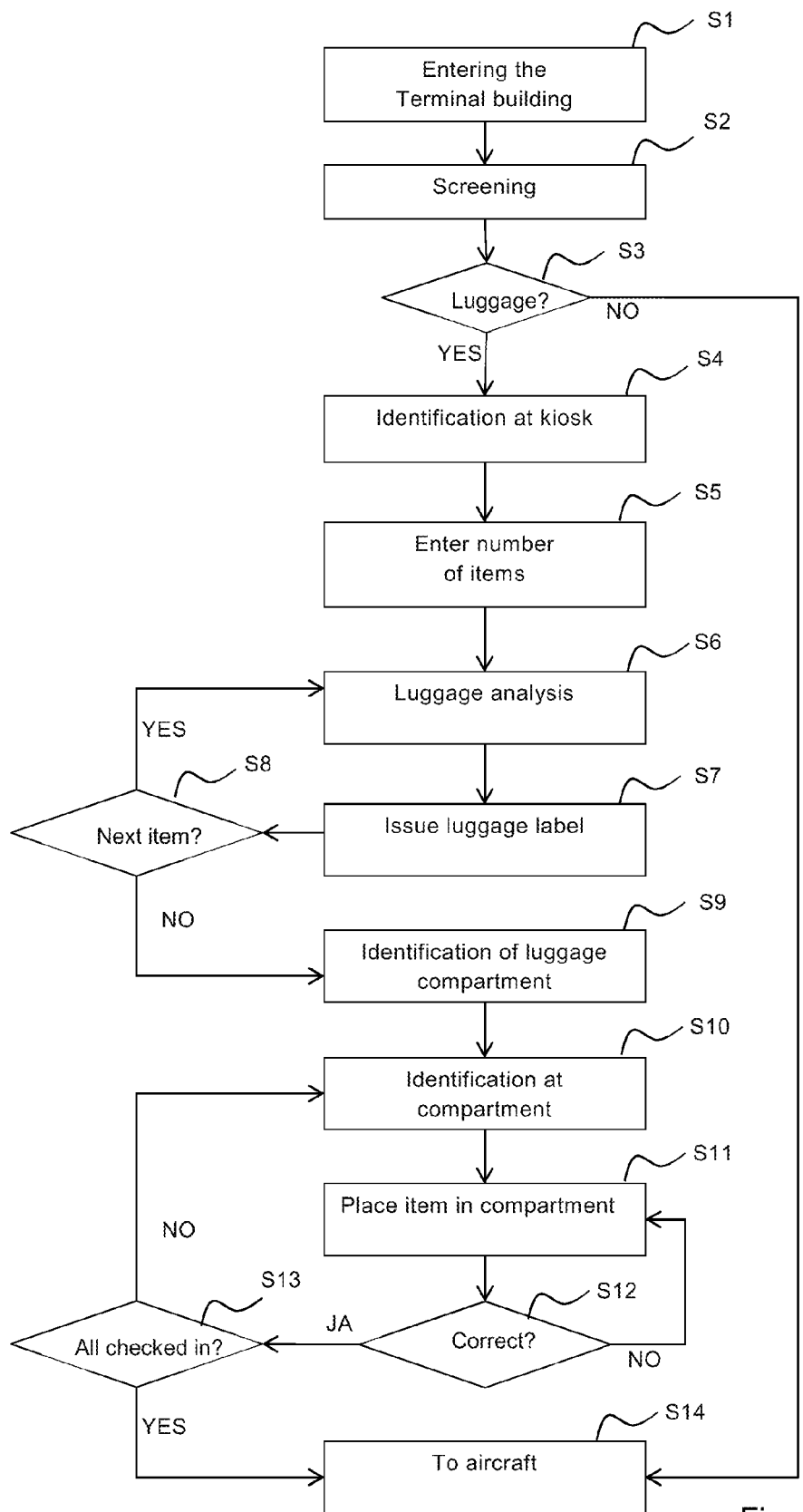
Figure 7B:
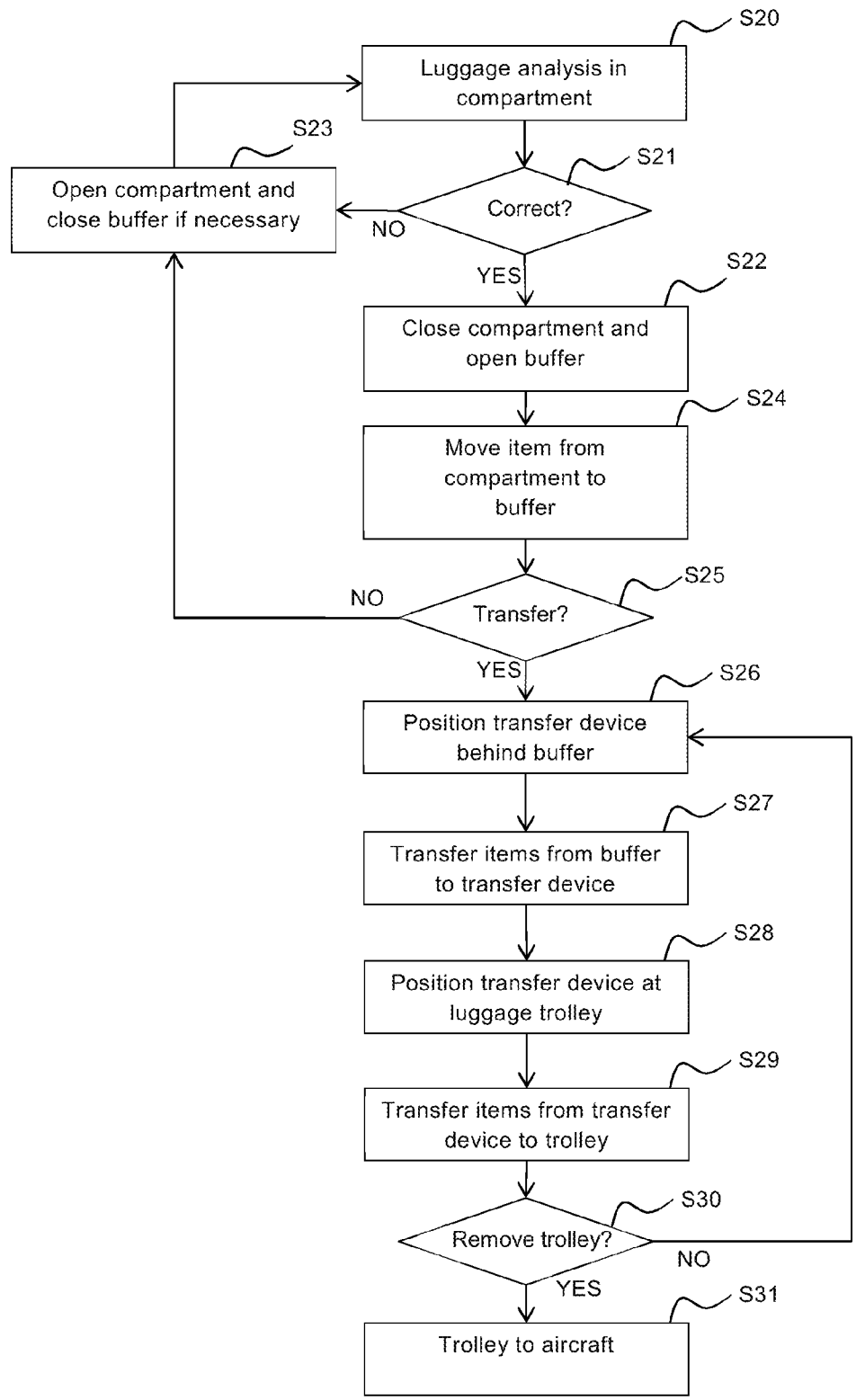

The invention will be explained in more detail below in a description of a number of preferred embodiments of devices according to the invention with reference to the accompanying diagrammatic drawings, in which:

FIG. 1 is a plan view of a preferred embodiment of a device according to the invention, FIG. 2 is a three-dimensional representation of part of the device of FIG. 1, FIG. 3 is a three-dimensional representation of a front of a part of the device of FIG. 1, FIG. 4 is a three-dimensional representation showing components of the device of FIG. 1 viewed from the rear, FIG. 5a is a three-dimensional representation showing components of a further preferred embodiment of a device according to the invention viewed from the rear, FIG. 5b shows components of the device of FIG. 5a in side elevation, FIG. 6 shows components of the device of FIG. 5a in a transport state thereof, FIG. 7a is a flowchart representing part of a preferred embodiment of a method according to the invention, and FIG. 7b is a flowchart representing a further part of the preferred embodiment of a method according to the invention to which FIG. 7a also relates.

FIG. 1 shows a device 1 for handling items of luggage 2. The ensuing description relates to an application of the device to the handling of outbound items of luggage. The device 1 is positioned in a building at an airport, more specifically in a terminal building. The building has a section 6 that is accessible to passengers and a section 11 that is screened off from passengers and where at least a major portion of the device 1 is located, as will become apparent below. Part of the section 6 of the terminal that is accessible to passengers has been delimited by separation elements such as, for example, barriers. This part is shown as a region 7 in FIG. 1. Passengers can enter the region 7 via an entrance 8 and leave the region 7 via an exit 9.

Upon entering the terminal building, a passenger together with his/her items of luggage is screened for the presence of forbidden objects. The result is that the passenger's items of luggage need not be screened anymore in the device 1 after checking-in. It is conceivable within the framework of the present invention, however, that the device 1 in an embodiment comprises means for screening items of luggage for the presence of forbidden objects. These means may comprise an X-ray device.

A passenger possessing a boarding pass can present him/herself at a kiosk 5, which forms part of the device 1, for the purpose of checking in his/her piece(s) of luggage. The kiosk 5 comprises input means comprising a reading device in the form of a scanner 51 for scanning the passenger's boarding pass. Identification information is thus put in for control means of the device 1 which are operationally connected to the scanner 51. The identification information read from the boarding pass comprises at least information about the identity of the passenger. In the present case, for example, information about the flight to be boarded by the passenger and possibly also the number of items of luggage to be checked in may be retrieved on the basis of the identification information from a database operationally connected to the control means. Alternatively, the identification information itself comprises information about the passenger's flight and possibly also about the number of items of luggage to be checked in by this passenger. In an embodiment, the input means further comprise an input element, such as a keyboard or a touch screen, with which the passenger can put in, for example, the number of items of luggage to be checked in, whereupon this input information is passed on to the control means.

Control means of a device according to the invention may be accommodated in the kiosk according to an embodiment, or they may be provided separately and be connected, by wired or wireless links, to components of the device such as the kiosk, the storage system, and the transfer device. It is noted in this connection that those skilled in the art will be aware that there are alternative options for accommodating and connecting the control means and that the control means may alternatively comprise a plurality of components which are provided in one or several locations.

The kiosk 5 further comprises a label printer 52 for printing a label for the item of luggage checked in by the passenger. The kiosk 5 also comprises an analysis device 53 for determining the weight and dimensions of an item of luggage. The analysis device 53 for this purpose comprises a weighing unit and a laser scanner for determining the external dimensions of an item of luggage. The label printer 52 and the analysis device 53 are preferably operationally interconnected such that information about the weight and/or dimensions of the item of luggage and information of the label are stored in the control means in an interconnected manner. The laser scanner is preferably designed such that it can determine at least the maximum length×width×height of an item of luggage with an accuracy of the order of a few centimeters. The analysis device may comprise warning means for indicating that a measured item of luggage has an overweight and/or excess dimensions. The device may comprise a payment unit, preferably as part of said kiosk, designed to enable a passenger to make a payment, the amount thereof being dependent, for example, on the degree to which weight requirements for an item of luggage are exceeded. The input means may also comprise a display element, preferably as part of said kiosk, such as a screen for showing, after a passenger has put in the identification information, any data about the passenger and/or his/her luggage previously stored in the control means, in which case an input element may be present for enabling the passenger to confirm that the data stored in the control means are correct.

The passenger can fasten a label issued by the label printer 52 to his/her item of luggage. The label printer 52 and/or the analysis device 53 are optional in the sense that it is alternatively possible within the scope of the invention that the items of luggage have already been provided with a label at an earlier stage, for example with an RIFD label, and/or that the dimensions and weight of the items of luggage to be checked in have already been determined at an earlier stage. Said earlier stage may be, for example, when the passenger enters the terminal building, i.e. during screening of the items of luggage as mentioned above. In an embodiment of a device according to invention, a label scanner is provided adjacent to the input means for scanning a label previously provided on an item of luggage. The label scanner may be part of said kiosk.

The region 7 adjoins the front of a storage system 3 for the temporary storage therein of items of luggage. The storage system 3 comprises at its front a number of compartments 10 which are located next to and above one another and which are mutually separated by wall elements 14. Each compartment 10 is adapted for accommodating an item of luggage 2, preferably to be placed therein by the passenger him/herself. An item of luggage is regarded as being checked in after the relevant item of luggage has been placed in a compartment 10 and has been analysed and found to comply, if applicable, as will be explained in more detail below. The item of luggage is then transported to the aircraft, as will be described in more detail below.

FIG. 2 shows the storage system 3 in an overall three-dimensional view. As FIG. 2 shows, the front face is subdivided into nineteen compartments 10 in the horizontal or lateral direction of the storage system 3 and into three compartments in the vertical or height direction thereof. The storage system 3 thus has a capacity of 57 compartments 10. Although all compartments in the embodiment of the storage system 3 shown in FIG. 2 have the same height and width, it is alternatively conceivable that the plurality of compartments 10 comprises a sub-group of compartments of a first type having first dimensions and a further sub-group of compartments of a second type having second dimensions different from the first. The compartments of the first type may be such, for example, that their width and height are adapted to accommodate the maximum admissible standard dimensions of an item of luggage transported by a given airline. A usual standard width×height is 50×40 cm with a depth of 70 cm. The compartments of the second type may have smaller dimensions in an embodiment, such as 40×25 cm with a depth of 70 cm so that, for example, weekend bags or beauty cases fit therein. The total number of compartments of the storage system can be increased thereby, so that the storage capacity is increased. It is equally conceivable that the storage system 3 comprises one, or at least very few so-termed odd size luggage compartments. These are extra large compartments for luggage having dimensions that deviate strongly from the usual dimensions. They may be width×height×depth dimensions of 65×100×70 cm. It is highly preferable for the depth of all compartments to be constant, so that a respective buffer zone present behind each of the compartments, irrespective of the type thereof, will always have the same depth, as will be explained further below.

Each compartment 10, as is shown in more detail in FIG. 3, can be closed at the front by means of a roll-down shutter 20, which is an embodiment of a closing element. The roll-down shutter 20 can be switched between a compartment closed state, in which the compartment 10 is closed and no item of luggage can be placed in the compartment 10, and a compartment release state, in which the compartment 10 is open and an item of luggage 2 can be placed therein, preferably by the passenger him/herself. The roll-down shutter 20 of the second compartment from the left in the upper row as shown in FIG. 3 is in the compartment release state whereas the roll-down shutters 20 of the other compartments 10 are in the compartment closed state.

A passenger should have the scanner 51 read out at least his/her boarding pass at a kiosk 5 in order to enter his/her identification information. After the kiosk 5 has been visited, the relevant items of luggage should have been provided with a label each, for example in that the passenger has attached labels printed by the label printer 52 to his/her items of luggage. Preferably, the weight and dimensions of the item of luggage or of each of the items of luggage should also have been stored in the control means and coupled to the identity of the passenger and to the passenger's flight.

After a passenger has performed the actions described above at the area of the kiosk 5, it is indicated to the passenger through the action of the control means of the device 1 in which compartment from among the plurality of compartments 10 he/she can place an item of luggage. In an embodiment, the input element is also designed for having a passenger enter a confirmation that his/her piece or items of luggage has/have been provided with a label before it is indicated into which compartment the passenger can place an item of luggage. The storage system 3 comprises an indicator lamp 26 at each compartment 10 for providing said indication. The storage system 3 also comprises a further scanner 24 for a boarding pass at each compartment 10. The passenger can present him/herself at the indicated compartment 10 and have his/her boarding pass scanned by the further scanner 24 so as to switch the roll-down shutter 20 associated with the relevant compartment 10 to its compartment release state. Alternatively, the further scanner 24 may be designed for scanning the label of an item of luggage in order to open the roll-down shutter 20 associated with this compartment 10. The passenger can now place an item of luggage in the relevant compartment 10.

The control means determine the specific compartment 10 in which the item of luggage is to be placed on the basis of the available information about the flight and the item of luggage. It is conceivable in an embodiment that, if the weight of the item of luggage is above 15 kg, for example, a compartment 10 in the bottom row of the three rows of compartments 10 extending one above the other will be indicated. The person who is to place the item of luggage in the indicated compartment 10 then need not lift the item of luggage, or at least not up to a high level. It is also conceivable that an item of luggage of small dimensions is assigned to a compartment of the optional second type mentioned above. It is furthermore possible that the length of an item of luggage is used for determining the compartment 10 in which this item of luggage is to be placed, i.e. in dependence on the available space in the depth direction in a buffer zone 12 associated with the relevant compartment 10, as will be described in more detail below. It is also conceivable that items of luggage belonging to a certain group of passengers, for example business class travelers, are collected in a number of compartments 10 lying close together. It is equally conceivable that the total number of compartments 10 of a storage system 3 is used for temporary storage of items of luggage belonging to a number of different flights, i.e. the item of luggage may be placed in a particular compartment allocated to a flight belonging to that item of luggage. To this end, the storage system 3 may be subdivided into a number of zones, for example three zones, in an embodiment. The total number of compartments 10 may thus be subdivided into three portions situated next to one another, each portion being three or four compartments wide and three compartments high. A separate kiosk 5 may be assigned to each portion of the plurality of compartments. The region 7 may also be subdivided into a corresponding number of portions, three in this example, i.e. one portion for each portion of the plurality of compartments and associated kiosk.

The storage system 3 further comprises behind each compartment 10 a buffer zone 12 which is associated with that compartment and in which on average two items of luggage can be accommodated. That is to say, the depth of the buffer zone is approximately twice the depth of the associated compartment 10. The depth of a compartment is such that one item of luggage of average size can be placed therein. Between a compartment 10 and the associated buffer zone 12 there is again a closing element provided, for example in the form of a roll-down shutter 22 shown in FIG. 3. Said roll-down shutter 22 is switchable between a buffer closed state, in which no item of luggage can be displaced from the compartment 10 into the associated buffer zone 12, i.e. the buffer zone 12 is shut, and a buffer release state, in which an item of luggage can be displaced from the compartment 10 into the associated buffer zone 12. The control means are arranged such that, when the roll-down shutter at the front of the compartment 10 is open, the roll-down shutter 22 at the rear will be closed, so that only the interior of the compartment 10, but not the buffer zone lying behind it, is accessible to an individual such as a passenger while an item of luggage is being inserted into the compartment 10. After the roll-down shutter 20 at the front has been closed, the roll-down shutter 22 at the rear of the compartment 10 can be opened. The bottom of a compartment 10 is substantially formed by a conveyor belt 16. The conveyor belt 16 adjoins a conveyor belt 16' which extends over the full depth of the buffer zone 12 behind the compartment. Alternatively only a single conveyor belt may be provided which extends both in the compartment and in the buffer zone behind it. When the conveyor belts 16 and 16' are driven under the influence of the control means, for example through electrical powering of belt drive motors for the respective conveyor belts 16 and 16', and the roll-down shutter 22 is open, an item of luggage 2 can be displaced from the compartment 10 into the buffer zone 12 situated behind it. In this manner an average of two items of luggage, highly preferably both destined for one particular flight, can thus be stored in one particular buffer zone 12 in the storage system 3. A number of items of luggage can accordingly be stored in the storage system 3 in the manner described above. This number is on average a maximum of 57 multiplied by 2, so 114 in the buffer zones plus 57 in the compartments (according to the embodiment shown in FIG. 2). The total capacity of the system in this example is accordingly 171 items of luggage. If the length of an item of luggage is taken into account in the allocation of a compartment to that item of luggage, as described above, then it is obviously conceivable that a buffer zone will be filled with a larger number of relatively short items of luggage, whereby a further optimization of the degree of occupancy of the buffer zones, i.e. of the capacity of the system, is achieved. In this connection the provision of two separate conveyor belts 16 and 16' is also useful because the non-synchronized drive actions of the two conveyor belts render it possible to minimize the interspacing between two consecutive items of luggage viewed in the depth direction of the storage system, i.e. viewed in the transport direction of the conveyor belt. An item of luggage placed in a compartment 10 may, for example, first be displaced by the conveyor belt 16 up to immediately in front of the closing element 22, whereupon this item of luggage in a position immediately adjoining a frontmost item of luggage, assuming that this is present, can be transported into the buffer zone in that the two conveyor belts 16 and 16' are now driven in synchronicity. The number of items of luggage that can be accommodated in a buffer zone may also vary in dependence on the type of compartment that is associated with the relevant buffer zone.

A transfer device 4 is provided, see especially FIG. 4, behind the storage system 3, i.e. at the rear side thereof which is not accessible to passengers since it is present in the region 11 mentioned above. The transfer device 4 comprises a conveyor belt 43 which extends transverse to the storage system 3, more particularly to the rear side thereof, and which is displaceable along vertical guide columns 44 in vertical direction along the storage system 3, said two columns 44 being displaceable along horizontally extending rails 42 in horizontal direction along the storage system 3. A first rail 42 is provided at the lower side, at the level of the floor surface on which the storage system 3 rests. A second rail is provided at the upper side, at the level of the upper surface of the storage system 3. The two rails 42 may be provided in a displaceable manner relative to the storage system 3 such that they are detachable or capable of pivoting between an extended, operational position, as shown in FIG. 4, and a collapsed position in which the rails preferably lie against the rear wall of the storage system 3. The construction with the rails 42 as described enables the transfer device 4 to reach any buffer zone 12, i.e. a support surface of the conveyor belt 43 can be brought into the same plane as a support surface of any conveyor belt 16' of a buffer zone 12. Since the conveyor belts 16' and 43 are oriented in parallel, items of luggage can be transferred in a simple manner from any conveyor belt 16' to the conveyor belt 43 of the transfer device 4. This is preferably achieved in that the conveyor belts 16' and 43 are synchronously driven, whereby an item of luggage is moved from the conveyor belt 16' onto the conveyor belt 43. Preferably, the total number of items of luggage present in the buffer zone 12 to which the conveyor belt 16' belongs is moved onto the transfer device in one operation. It is highly preferable that the length of the conveyor belt 43 is equal or at least substantially equal to the length of the conveyor belt 16'.

A collection location 60 is provided at the rear side of the transfer device 4 facing away from the storage system 3 so as to extend preferably over the entire width of the storage system 3 and parallel to the rear side thereof. The collection location 60 may be a portion of the floor surface. The collection location 60 is accordingly indicated with broken lines in FIGS. 1 and 4. It is advantageous in a practical implementation to mark this portion of the floor surface, for example with demarcation lines.

An airport in which the device 1 is present will in most cases have available its own "trains" comprising a traction vehicle and a number of luggage trolleys behind it. Items of luggage destined for one flight can be loaded onto the luggage trolleys. The train then rides to the apron where the aircraft is parked, whereupon the items of luggage are transferred from the luggage trolleys to the hold of the aircraft. Two mutually coupled luggage trolleys 61 are shown in FIGS. 1 and 4, not coupled to a traction vehicle. To facilitate the loading of items of luggage onto the luggage trolleys 61, a lateral side of the latter facing the transfer device is open whereas the front and rear sides and the opposed lateral side thereof, and possibly also the upper side, are closed or partly closed. The luggage trolleys 61 are arranged in the collection location 60 in predetermined positions. It is essential for this that a side of each luggage trolley 61 facing the transfer device 4 is positioned so as to adjoin the conveyor belt 43 of the transfer device 4. Items of luggage can thus be directly transferred from the conveyor belt 43 to the luggage trolleys 61 without having to bridge a gap. As FIG. 4 shows, the storage system 3 is provided with support legs. The height of these support legs is chosen such that an upper surface of a conveyor belt 16' present in the lowest of the three rows of buffer zones 12 lying one above the other is at approximately the same level as a support surface for items of luggage on a luggage trolley 61. This, however, is not essential since any level difference may also be bridged by a vertical displacement of the conveyor belt 43 of the transfer device 4.

If the storage system 3 contains a sufficient number of items of luggage, all destined for one particular flight, for filling at least one luggage trolley 61, the device 1 can be controlled by its control means such that items of luggage are repeatedly moved from a buffer zone 12 via the conveyor belt 43 of the transfer device 4 to the luggage trolley 61. The transfer of items of luggage from the conveyor belt 43 to the luggage trolley is preferably performed semi-manually. By this is meant that an operator is present at the conveyor belt 43. This operator controls the transfer device such that the conveyor belt thereof, loaded with at least one item of luggage, is so positioned relative to the luggage trolley that the at least one item of luggage is moved off the conveyor belt 43 and enters the luggage trolley 61 in a free spot when the conveyor belt 43 is energized. In a preferred embodiment, the conveyor belt of the transfer device is extendable in a direction away from the storage system. This renders it possible to place items of luggage in free spots on the luggage trolley in an accurate manner since in this preferred embodiment the conveyor belt can be extended so as to lie partly above the luggage trolley.

As was stated above, the length of the conveyor belt 43 is approximately equal to the depth of the buffer zone 12. This dimension is furthermore approximately equal to the width of a luggage trolley 61, so that a row of two items of luggage present in a buffer zone 12, or at least a row of items of luggage filling the buffer zone over at least substantially its full depth, will also fill the conveyor belt 43 at least substantially completely and, after being transferred to the luggage trolley 61, will form a row that extends over at least substantially the full width of the luggage trolley 61. In this manner a row of two items of luggage can be transferred from a buffer zone 12 to the luggage trolley 61 each time until the luggage trolley 61 is full. If a further luggage trolley 61 is present in the collection location and the storage system still contains a sufficient number of items of luggage destined for one particular flight for filling at least one further luggage trolley 61, the above procedure can be repeated until this further luggage trolley is full. A final luggage trolley 61 may be filled, possibly partly, for example shortly before, such as 20 minutes before the departure of an aircraft, with items of luggage still present in the storage system and destined for this aircraft. The luggage trolley or trolleys is or are collected by a traction vehicle and rolled to the aircraft, possibly in a group together.

FIGS. 5a and 5b show part of a device 100 as a further preferred embodiment of a device according to the present invention. The device 100 comprises a storage system 103 that is identical to the storage system 3 of the device 1 described above. Corresponding components have been given corresponding reference numerals. The device 100 comprises a kiosk 5, as does the device 1, and the device 100 itself and the method of handling items of luggage are as described for the device 1. After passing by the kiosk 5, items of luggage are thus first placed in a compartment 10 and then transferred to buffer zones 12 by conveyor belts 16. The system with the roll-down shutters 20 and 22 is also the same.

The device 100 differs from the device 1 in the construction of the transfer device. The device 100 has two rails 142, one at the upper side of the storage system 103 and one at the lower side of the storage system 103, directly fastened thereto at the rear of the storage system 103. A conveyor belt 43 is suspended from two vertical columns 144 so as to be displaceable in vertical direction, which columns 144 in their turn are connected to the two rails 142 so as to be displaceable in horizontal direction. The conveyor belt 43 can be folded in from an operational position shown in FIG. 5a into a transport position shown in FIG. 6, in which it is pivoted against the rear wall of the storage system 3, as will be explained in more detail further below.

The collection location 60 of the device 1 is formed by a defined portion of the floor surface behind the transfer device 4. The collection location for the device 100 comprises a conveyor belt 162 which is arranged transverse to the conveyor belt 43 and which accordingly extends parallel to a width direction of the storage system 103. Luggage holders, for example in the form of a luggage container, can be placed at an upstream end of the conveyor belt 162, which holders are transported into a predefined position by the drive of the conveyor belt 162 triggered by the control means. Said holders there in fact perform the same function as the luggage trolleys 61 described above, i.e. a certain quantity of luggage for one flight can be loaded thereon by means of the conveyor belt 43 of the transfer device 104. In a preferred embodiment, the conveyor belt 43 of the transfer device 104 is extendable in a direction away from the storage system. This renders it possible to place items of luggage in free spots on the luggage container in an accurate manner since in this preferred embodiment the conveyor belt can be extended so as to lie partly above the luggage container.

At a downstream end of the conveyor belt 162, a loaded container can then be taken from this conveyor belt 162 and moved towards an aircraft. Said containers may be aircraft containers, i.e. containers whose shape and dimensions are adapted to fit the hold of an aircraft and which are designed to be placed with the items of luggage loaded therein in the aircraft. The containers may alternatively be airport containers which are not loaded onto the aircraft. These containers may be placed, for example, on undercarriages with wheels, by which in fact the train described above can be formed again. Like the luggage trolleys 61, the containers loaded with luggage may be temporarily stored, if so desired, before being transported to the aircraft.

FIG. 5b is a lateral elevation of the device 100, showing that the upper surfaces of the conveyor belts 16, 16', 43 and 162 are at least substantially in one plane. As a result of this items of luggage can move in a particularly reliable manner from a buffer zone 12 via the transfer device 104 to the conveyor belt 162 or at least to a container present thereon. The transfer of items of luggage from a buffer zone not at the lowest level of the three vertical levels is effected in a simple and reliable manner because only the conveyor belt 43 of the transfer device has to perform a linear vertical displacement for taking over items of luggage from the respective buffer zone. If several layers of luggage can be stacked on a container at the collection location, and the same holds by analogy also for the situation described above with respect to luggage trolleys in the device 1, then it is also conceivable that the required vertical movement of the transfer device 104 is very small or even zero during filling of a second layer of items of luggage onto the container from buffer zones in the middle vertical level of the storage device 103.

The conveyor belt 162 is connected to the storage system 103 by means of two beams 163, one at the upstream end and one at the downstream end, whereby the position of the conveyor belt 162 relative to the storage system 103 is defined. The beams 163 are hinged to the storage system 103 by their ends facing the storage system, such that the conveyor belt can be pivoted upwards from an operational position shown in the FIGS. 5a and 5b into a transport position shown in FIG. 6 and to be explained below.

FIG. 6 shows said storage system 103, transfer device 104, and conveyor belt 162 of the collection location 160 in the transport position, as mentioned above, wherein both the conveyor belt 43 of the transfer device 104 and the conveyor belt 162 are pivoted up against the rear wall of the storage system 103. The device 100 is configured such that in this transport position the storage system, the transfer device, and the conveyor belt 162 as an assembly together fall within the inner dimensions of a transport container 70 such as a standard "40 ft shipping container". This makes for a very simple transport of the device 100, which can thus be quickly moved from one airport to another. A kiosk 5 may furthermore be designed such that it fits, possibly after assuming a transport position, within an odd-size luggage compartment, if this is present in the storage system 103, whereby the compactness of the device during transport is further enhanced.

A preferred embodiment of a method according to the invention for handling outbound items of luggage will be described step by step below, wherein the device 1 according to the invention is used.

First a preferred embodiment of a portion of the method according to the invention that is relevant to the passenger will be explained with reference to FIG. 7a. Then the portion of the method relating to the handling process of the items of luggage will be discussed with reference to FIG. 7b.

After arriving at an airport, a passenger having hand luggage and one or more items of luggage to be checked in will enter the terminal building (S1: "Entering the terminal building"). The passenger and the accompanying luggage are subsequently screened for forbidden objects, usually by an X-ray device (S2: "Screening"). If the passenger has no check-in luggage (S3: "Luggage?" NO), this passenger can proceed to the aircraft (S14: "To aircraft") without reporting to the device for handling items of luggage, more specifically to the kiosk thereof as described above. If the passenger does have items of luggage to be checked in (S3: YES), this passenger reports to a kiosk, for example the kiosk 5 described above, of the device for handling items of luggage and identifies him/herself by entering identification information into control means with the use of input means, which is effected in that a scanner reads out the passenger's boarding pass (S4: "Identification at kiosk").

If the number of items of luggage to be checked in is not yet stored in the control means, which may be made visible to the passenger, for example on a display (optional step not shown in the flowchart "Number of items known?" between S4 and S5), the passenger now enters the number of items of luggage to be checked in, for example by using a keyboard or touch screen that is operationally connected to the control means (S5: "Enter number of items"). The passenger then places an item of luggage in an analysis device which determines the weight and dimensions of the item of luggage and enters these data into the control means (S6: "Luggage analysis"). A label printer is then triggered by the control means into printing a label containing the usual information such as the flight number etc., so that the passenger can attach this label to the item of luggage (S7: "Luggage label issued"). If the passenger wishes to check in a further item of luggage (S8: "Next item?"; YES), the steps S6, S7 and S8 are repeated for this further item of luggage, until all items of luggage of this passenger have been analysed and labelled (S8; NO). It is usual for a passenger to check in one item of luggage, and in some cases two items of luggage.

It is subsequently indicated to the passenger by the control means in which compartment or compartments of the storage system the item or items of luggage should be stored (S9: "Indication of luggage compartment"). In an alternative embodiment of the method, the step S8 may be performed after step S9, i.e. a compartment is indicated after each item of luggage before any further item of luggage of the same passenger is analysed and issued with a label. Step S9 may be performed in that an indicator lamp lights up next to or on the compartment. Alternatively or in addition thereto, a compartment number may be shown on a display, for example at the kiosk, in which case each compartment is provided with a clearly discernible number.

The passenger subsequently proceeds with his/her piece(s) of luggage to the front of the storage system and holds his/her boarding pass against a boarding pass scanner that belongs to the indicated compartment such that it can be read out for identifying the passenger present directly in front of the compartment (S10: "Identification at compartment"). Once the passenger has identified him/herself at the correct compartment, the first closing element in the form of a roll-down shutter at the front of the relevant compartment will open and the passenger can insert the item of luggage, i.e. the correct item in the case of several items, in the compartment (S11: "Place item in compartment"). If the passenger reports at an incorrect compartment, the roll-down shutter of that compartment will not open. The passenger can then find out at which compartment he/she should have reported, for example by returning to the kiosk, or by once more looking at the compartments to see which compartments were indicated to him/her. Placement of the "correct" item of luggage in the compartment may be achieved in that the passenger remembers in which compartment he/she is to place which of his/her several items of luggage, in that at the area of the compartment a display shows which serial number or similar identifier of said several items is to be placed in the compartment, which serial number then is also printed on the label, or by similar means.

After the passenger has placed an item of luggage in a compartment, it is checked by detection means present in the compartment whether the correct item of luggage has indeed been inserted in the compartment (S12: "Correct?"). This may be achieved, for example, by means of a label scanner. If the correct item of luggage has not been placed in the compartment (S12; NO), this will be communicated to the passenger, for example by means of an alarm signal. The compartment is opened again, if it had been closed already, and the passenger should take the item of luggage from the compartment and place it, after checking it, in the correct compartment as described above with reference to step S11. If the correct item of luggage has been inserted (S12; YES), this may optionally also be communicated to the passenger, for example by a green indicator lamp lighting up at the compartment. Alternatively, the roll-down shutter of the compartment present at the front thereof may close at that moment, if it was not already closed, in order to indicate to the passenger that the correct item of luggage was placed in the compartment. The control means in general lay down which item of luggage is present in which compartment, so that the location of each checked-in item of luggage is known. Subsequently the control means check whether all items of luggage from among the plurality of items of luggage put in during step S5 have been placed in a compartment (S13: "All checked in?"). If they have not (S13; NO), the steps S10-S13 are repeated. If they have (S13; YES), the passenger can proceed to the aircraft (S14).

In the case of a passenger having more than one item of luggage, the following sequence of steps may alternatively be performed: S5, S6, S7, S9, S10, S11, S12, S13, with a return to S6 if S13=NO. This implies that all steps are performed for each item of luggage separately from the luggage analysis step to the placement in the compartment, whereupon the same sequence is repeated for a next item of luggage. The risk or errors on the part of the passenger is smaller in this modification because the passenger cannot, for example, inadvertently place a "second" item of luggage in the compartment assigned to the "first" item of luggage of that passenger. On the other hand, the passenger has to make a greater effort here because he/she is to go from the kiosk to the storage system and back again for each item of luggage separately.

FIG. 7b diagrammatically shows the relevant steps of a preferred embodiment of a method according to the invention for the handling of an outbound item of luggage. After a passenger, or at least a person, has placed an item of luggage in a compartment, this item of luggage is first analysed in the compartment itself (step S20: "Luggage analysis in compartment"), for example by a label scanner. The compartment has possibly been closed before this by moving the roll-down shutter at the front of the compartment into the compartment closed state. If an incorrect item of luggage, or none at all, is present in the compartment (S21: "Correct?"; NO) (step S21 corresponds to step S12 described above), the compartment is opened again if it had been closed already (S23 "Open compartment and close buffer if necessary"), and an alarm signal is preferably given so that the passenger can remove the item of luggage again and check what is wrong (or have it checked). In this situation the buffer zone is still closed, and the opening of the buffer zone through switching of the roll-down shutter between the compartment and the buffer zone into the buffer release position is not necessary during step S23. If the correct item of luggage was placed in the compartment (S21; YES), the compartment is closed and the buffer zone is opened, i.e. the roll-down shutter between the compartment and the buffer zone is switched into its buffer release position (S22 "Close compartment and open buffer"). Now the item of luggage can be transferred to the buffer zone (S24 "Move item from compartment to buffer"). Before this transfer, it is part of step S24 to check whether there is space in the buffer zone for accommodating the item of luggage coming from the compartment. If not, the item of luggage is not (yet) moved from the compartment to the buffer zone.

It is subsequently checked whether the items (or item) of luggage from the compartment present in the buffer zone are to be transferred to the transfer device (S25 "Transfer?"). This action may be initiated, for example, in that a command to fill a luggage trolley is entered into the control means of the device. This command may arise as a result of, for example, a previous message from the control means indicating that there are enough items of luggage destined for a given flight in the storage system for filling a luggage trolley, whereupon an empty luggage trolley is presented at the collection location. If no items of luggage need or can be transferred from the buffer zone yet (S25; NO), and if the compartment associated with the relevant buffer zone is empty, the buffer will be closed, i.e. the roll-down shutter between the compartment and the buffer zone is moved into the buffer closed state and a signal is awaited to the effect that the compartment can be opened (step S23). If the buffer zone and the compartment are both full, the system waits until items of luggage can be transferred from the relevant combination of compartment and buffer zone.

If items of luggage can be transferred from the buffer zone (S25; YES), the transfer device is controlled by the control means such that it is positioned behind the buffer zone (S26 "Position transfer device behind buffer"). Then the conveyor belt of the buffer zone and the transfer device, preferably a conveyor belt thereof, are synchronously driven so that the items of luggage are transferred from the buffer zone, and if applicable also from the compartment via the buffer zone, to the conveyor belt of the transfer device (S27 "Transfer items from buffer to transfer device"). It will be clear that, while items of luggage are being transferred from a given buffer zone to the transfer device, other compartments may handle items of luggage simultaneously according to the steps S20-S25 described above. If a buffer zone and an associated compartment each have a separate conveyor belt, it is possible for the associated compartment to handle a next item of luggage according to the steps S20-S22 during the transfer of an item of luggage from the buffer zone to the transfer device.

After items of luggage have been transferred to the transfer device, the transfer device is positioned adjacent to the luggage trolley (S28 "Position transfer device at luggage trolley"). If there is an insufficient number of items of luggage present in a buffer zone, and possibly in the associated compartment, for filling the transfer device completely during step S27, it is possible for the steps S26 and S27 to be repeated at other buffer zones until the transfer device is completely filled with items of luggage destined for a given flight. After said step 28 the items of luggage are transferred into the luggage trolley (S29 "Transfer items from transfer device to trolley"). After this it is determined whether the luggage trolley can be removed from the collection location (S30: "Remove trolley?"), which will usually be the case when the trolley is completely full. If it is not (S30; NO), the trolley remains available at the collection location and the steps S26-S30 are repeated, highly preferably in immediate succession, until the luggage trolley is full or at least is ready (S30; YES) for being collected to be pulled to the aircraft (S31: "Trolley to aircraft"), for example at a fixed moment prior to the departure of the aircraft and/or if the storage system does not contain any more items of luggage for the relevant flight. Optionally, a filled luggage trolley may first be moved to a buffer location for luggage trolleys, for example in order to fill a number of trolleys first as described above, and then the number of trolleys may be pulled together as a train to the aircraft.

In an alternative embodiment of a device according to the invention, the storage system 3 together with the kiosk 5 is temporarily provided for the receiving of items of luggage in a location other than the location where the storage system is to be unloaded. This other location may be, for example, outside the departures hall. This enables passengers to check in items of luggage, for example, in a car park or the like. When the storage system has at least been partly filled with items of luggage and is ready for unloading, it is moved to a location where the storage system is to be unloaded and the luggage is further handled, and where preferably a transfer device is present. In the case of a device comprising a transfer device, therefore, there is an additional step between S25 and S26 in the method described above (step S25b; "Move storage system to location where transfer device is present").

In yet another alternative embodiment of a device according to the invention designed for handling inbound or reclaim luggage, a device largely identical to the above device 1 (or 100) may be used. The differences in the handling of inbound items of luggage will be discussed below.

The kiosk 5 comprises input means for handling inbound items of luggage, comprising a reading device in the form of a scanner comparable to the scanner 51 which is capable at least of reading identification information of a passenger, which identification information may take the form of an identity document, a reclaim ticket, or a boarding pass as with the scanner 51. The scanner is preferably designed at least for reading a reclaim ticket. The label printer 52 and the analysis device 53 described further above as forming part of the equally described kiosk 5 are not required in the present preferred embodiment for handling inbound items of luggage, although they may be present in the case of a device of universal construction with which both outbound and inbound items of luggage can be handled.

The storage system corresponds for the major part to the storage system 3. However, the conveyor belts 16, 16', or the alternative single conveyor belt that extends both in the compartment and in the buffer zone behind it, are at least drivable, and preferably also drivable under the influence of the control means, such that an item of luggage can be displaced from a buffer zone 12 to the associated compartment 10.

The control means cause the identification information, such as the reclaim ticket, to be read out and indicate on that basis in which compartment 10 the item or one of the items of luggage of the relevant passenger is ready for being taken out. For this purpose the roll-down shutter 20 may be opened in a manner analogous to that described above.

The presence of a transfer device comparable to the transfer device 4, 104 though not necessary, is desirable. For the purpose of handling reclaim luggage, the conveyor belt 43 is at least, or preferably also designed for moving items of luggage, placed thereon from a supply means such as a luggage trolley, towards the storage system 3, more specifically into a buffer zone 12 thereof.

In a preferred embodiment of a method according to the invention for handling inbound items of luggage with the use of the device as described above arranged for handling inbound items of luggage, the following steps are performed, which steps will be described below and some of which have already been discussed in more detail above.

First the portion of the method relating to the handling process of items of luggage will be described. Then the portion of the method relevant to the passenger will be elucidated.

After an aircraft has landed, the passengers alight and the passengers' items of luggage are unloaded.

The items of luggage may be transported on luggage vehicles such as luggage trolleys to a collection location belonging to the device according to the invention (analogous to step S31 but in opposite luggage transport direction). Here the items of luggage may be directly transferred to buffer zones 12 of the storage system 3 by hand, or alternatively by means of a transfer device 4 (analogous to steps S28, S29, S26 and S27 in that order, with individual steps taking place in opposite luggage transport direction each time). Subsequently an item of luggage present in a given buffer zone 12 is displaced by displacement means such as 16, 16' into the associated compartment 10 (step S24; in opposite luggage transport direction). Prior to this the second closing element 22 is switched to the buffer release state. After the item of luggage has been displaced, the second closing element is switched to the buffer closed state again. The item of luggage is analysed by the scanner means present in the compartment which read out a label of the relevant item of luggage that was moved into the compartment. Alternatively, the transfer device may be provided with scanner means connected to the control means for reading a label on an item of luggage before this item of luggage is moved into a buffer zone. A "label" in the context of the invention is understood to be an identification element of an item of luggage such as a printed paper tag, a bar code, an RFID tag, a frequent flyer card, an NFC tag, or the like. The scanned information is passed on to the control means.

When a passenger arrives at the kiosk 5, he/she identifies him/herself by causing the scanner 51 to scan, for example, his/her reclaim ticket or identity document (step S4). The control means then communicate to the passenger in which compartment an item of luggage is available for this passenger (step S9). The passenger may again indentify him/herself at the relevant compartment (step S10), if applicable, by having his/her reclaim ticket scanned by a scanner belonging to this specific compartment. The first closing element 20 will now open if the scanned identification information corresponds to the information on the item of luggage, and the passenger can take the item from the relevant compartment (step S11; but removal from compartment instead of insertion into compartment). This compartment is now available for receiving a further item of luggage from the associated buffer.

The invention claimed is:

1. A device for handling items of luggage, comprising:
a storage system for temporary storage therein of items of luggage, comprising at a front side thereof a plurality of compartments for items of luggage located next to and above one another and mutually separated by wall elements, wherein behind each of the plurality of compartments a buffer zone associated with the respective compartment is provided for at least one item of luggage, and wherein for each of the plurality of compartments a respective displacement element is provided designed for displacing an item of luggage from a compartment to the buffer zone associated therewith and/or from a buffer zone to the associated compartment,
input means designed for the input of identification information by a passenger for the purpose of placing an item of luggage of the passenger in one of the plurality of compartments of the storage system or taking such an item of luggage from one of the plurality of compartments of the storage system, and
control means designed for indicating to a passenger, in dependence on the identification information put in by the passenger with the input means, into which one of the plurality of compartments of the storage system to place an item of luggage or from which to take an item of luggage, and for controlling the relevant displacement elements so as to displace an item of luggage from one or more of the plurality of compartments to the associated buffer zone and/or vice versa.

2. A device according to claim 1, further comprising a transfer device that is provided adjacent to the storage system and that is reciprocally displaceable along the storage system such that an item of luggage can move from any of the buffer zones to the transfer device for transfer of the item of luggage to a luggage discharge means arranged in a collection location, such as a luggage holder such as a luggage trolley, or a luggage conveyor belt, and/or such that an item of luggage can move from the transfer device into any buffer zone.

3. A device according to claim 2, wherein the control means are also designed for controlling the transfer device so as to cause an item of luggage to move from a buffer zone to the transfer device and/or vice versa.

4. A device according to claim 1, wherein each compartment at a front side thereof comprises a first closing element that is switchable between a compartment closed state, in which no item of luggage can be placed into or taken from the compartment, and a compartment release state, in which an item of luggage can be placed into or taken from the compartment, while the control means are designed for switching the respective first closing elements between the compartment closed state and the compartment release state, and wherein each compartment at a rear side thereof, i.e. between the compartment and the associated buffer zone, comprises a second closing element that is switchable between a buffer closed state, in which no item of luggage can be displaced between the compartment and the associated buffer zone, and a buffer release state, in which an item of luggage can be displaced between the compartment and the associated buffer zone, while the control means are designed for switching the respective second closing elements between the buffer closed state and the buffer release state, and wherein the control means are designed for moving the first and second closing elements such that, when the first closing element of a compartment is in the compartment release state, the second closing element of that compartment will be in the buffer closed state.

5. A device according to claim 1, wherein the displacement element comprises a conveying element that extends into the buffer zone and that is designed for carrying at least one item of luggage.

6. A device according to claim 5, wherein the transfer device comprises a luggage crane which is displaceable along the storage system and which comprises a vertically adjustable transferrer element that extends away from the storage system in the direction of the collection location such that the transferrer element can be positioned adjacent to each of the buffer zones.

7. A device according to claim 6, wherein the transferrer element has a support surface for items of luggage that can be positioned, under the influence of the control of the luggage crane by the control means, in at least substantially the same plane as a support surface for items of luggage of the conveying element of the displacement element of a buffer zone, while the control means are also designed for controlling the transferrer element and the conveying element such that an item of luggage present on the conveying element can move onto the transferrer element and/or vice versa.

8. A device according to claim 1, wherein the storage system has compartments of a first type with first dimensions and compartments of a second type with second dimensions which are different from the first dimensions.

9. A device according to claim 1, wherein the input means comprise a scanner device for scanning a boarding pass, an identity document such as a passport, or a reclaim ticket of a passenger.

10. A device according to claim 1, wherein external dimensions of the storage system correspond at least substantially to the dimensions of a container of the "40 ft shipping container" type.

11. A method of handling items of luggage with the use of a device for handling luggage according to claim 1, wherein the displacement element is designed at least for displacing an item of luggage from a compartment to the buffer zone associated with that compartment, the control means are designed at least for controlling the respective displacement elements for the displacement of an item of luggage from a compartment to the associated buffer zone, the method comprising the steps of:
a) input by a passenger via the input means of an identification information, the identification information being such that at least the passenger's flight and the number of items of luggage of the passenger to be checked in are known from the identification information,
b) indicating one of the plurality of compartments of the storage system to the passenger with the use of the control means,
c) placing an item of luggage in the indicated compartment,
d) controlling, by the control means, of the displacement element belonging to the indicated compartment such that the item of luggage is displaced from the indicated compartment into the buffer zone,
e) achieving that the item of luggage is transferred from the buffer zone to a luggage discharge means arranged in a collection location, such as a luggage holder or a luggage trolley, or to a luggage conveyor belt.

12. A method according to claim 11, wherein the device further comprises a transfer device that is, or at least that can be provided adjacent to the storage system and that is reciprocally displaceable along the storage system such that an item of luggage can move from any of the buffer zones to the transfer device for the purpose of transferring this item of luggage from the buffer zone to the luggage discharge means present in the collection location, wherein the control means are preferably also designed for controlling the transfer device so as to cause an item of luggage to move from a buffer zone to the transfer device, which method comprises as part of step e):
e1) by means of the transfer device, causing an item of luggage to move from a buffer zone to the transfer device, preferably in that the control means control at least the transfer device such that an item of luggage present in a buffer zone moves onto the transfer device, and
e2) transferring an item of luggage present on the transfer device from this transfer device to a luggage discharge means, preferably in that the control means control the transfer device to this effect.

13. A method according to claim 12, comprising after step c) and prior to step e) displacing the storage system from a location at a distance from the transfer device towards the transfer device so as to position the transfer device adjacent to the storage system.

14. A method according to claim 11, wherein each compartment comprises at a front side thereof a first closing element that is switchable between a compartment closed state, in which no item of luggage can be placed in the compartment, and a compartment release state, in which an item of luggage can be placed in the compartment, and each compartment comprises at a rear side thereof, between the compartment and the associated buffer zone, a second closing element that is switchable between a buffer closed state, in which no item of luggage can be displaced from the compartment into the associated buffer zone, and a buffer release state, in which an item of luggage can be displaced from the compartment into the associated buffer zone, the method comprising for the purpose of step b) switching, by the control means, of the first closing element of the compartment to its compartment closed state, and for the purpose of step d) switching, by the control means, of the second closing element of the compartment to its buffer release state and of the first switching element of the compartment to its compartment closed state.

15. A method of handling items of luggage with the use of a device for handling luggage according to claim 1, wherein
the displacement element of each compartment is designed at least for displacing an item of luggage from a buffer zone to a compartment associated with that buffer zone,
the control means of the device are designed at least for controlling the respective displacement elements so as to displace an item of luggage from a buffer zone to the associated compartment,
which method comprises the steps of:
a) placing an item of luggage in a buffer zone,
b) controlling the displacement element of the compartment associated with the buffer zone, by the control means, such that the item of luggage is displaced from the buffer zone into the compartment,
c) input of identification information by a passenger, using the input means,
d) indicating to the passenger, by the control means, in which of the plurality of compartments of the storage system this passenger's item of luggage is present,
e) taking the item of luggage from the relevant compartment.

16. A device for handling luggage, comprising:
a storage system for providing temporary storage of luggage, the storage system including a plurality of luggage compartments adapted to accept the luggage, the plurality of luggage compartments arranged in rows and columns;
a buffer zone associated with the luggage compartments to accept luggage from one or more of the luggage compartments;
a displacement element adapted displace luggage from one of the plurality of compartments to the buffer zone;
an input panel adapted to permit the input of identification information by a passenger for the purpose of placing an item of luggage of said passenger in one of the plurality of compartments of the storage system,
a controller adapted to provide an indicator to a passenger, in dependence on the identification information put in by said passenger, which one of the plurality of compartments of the storage system to place an item of luggage and for controlling the relevant displacement elements so as to displace an item of luggage from one or more of the plurality of compartments to the associated buffer zone.

* * * * *